Patented May 1, 1945

2,374,918

UNITED STATES PATENT OFFICE 2,374,918

COMPOSITIONS FOR PARASITICIDAL USE

Kenneth R. Brown, Kennett Square, Pa., assignor to Atlas Powder Company, Wilmington, Del., a corporation of Delaware No Drawing. Application June 14, 1941, Serial No. 398,175

15 Claims. (Cl. 167—22)

The present invention relates to compositions for parasiticidal use.

An object of the invention is to provide compositions which are toxic to parasites and particularly to soft-bodied insects.

Another object is to provide compositions of certain partial esters and rotenone-containing toxic material which exhibit a high degree of parasiticidal activity.

The above and other objects will become apparent from the following specification.

Whereas the saturated $C_{18}$ fatty acid glycerides have very low insecticidal toxicity, the partial esters, particularly the monoesters, of the mono- and dienoid $C_{18}$ straight chain aliphatic acids and certain higher polyhydroxylic compounds have been found to be capable of use as practical parasiticides. Furthermore, the esters of this invention yield a particularly efficacious synergistic combination with rotenone.

The mono- and dienoid acids, for example, oleic and linoleic acids, used may be substantially pure, or technical mixtures may be employed such as those obtained from cottonseed, corn, soya, olive and other semi-drying oils, or by selective hydrogenation of oils containing trienoid C-18 acids. While the saturated acids present are not particularly deleterious, and act chiefly as diluents, their removal by various means well known in oil refining, such as winterizing, solvent extraction and the like, is advantageous where practicable.

The polyhydroxylic component includes typically erythritol; pentitols; hexitols; pentaerythritol; hexane pentols; di- and triethylene glycol; butane-, pentane-, and hexane-diols; di- and higher polyglycerols; hexitans and hexides; sucrose; cyclitols such as inositol; and the lower hydroxy-ethyl or polyglycol ethers of such polyhydric compounds. A certain proportion of hydroxyls must be maintained, and I have found that the best of these materials fall into the group consisting of neutral polyhydroxylic compounds containing at least 4 carbon atoms and wherein the ratio of carbon atoms to hydroxyl groups does not exceed 3, and the molecular weight does not exceed that of the oligosaccharides.

The esters can be produced by known methods. The saccharides in general require the gentle acid chloride-organic base procedure. The more resistant polyalcohols and ether alcohols can be reacted directly with the acids, with or without catalysts. For the hexitan or hexide esters it is generally convenient to start with the hexitol and carry out anhydro-formation concurrently with esterification, using alkaline or acid catalysts to promote mono-, or di-anhydro formation, respectively.

Particularly effective as well as economical products are obtained by the alcoholysis or re-esterification of the common semi-drying oils, containing major amounts of oleates and linoleates, with the desired polyhydroxylic compound. With polyols containing up to four hydroxyls, usually at least two mols of the polyol per mol of oil are employed to promote monoester formation. With polyols containing more than four hydroxyls, such as inositol, or tetraglycerol, useful products may be prepared by reacting less than 2 mols of polyol. The residual monoglyceride in such products is only a minor constituent. Although not particularly effective by itself, it apparently does not detract sensibly from the effectiveness of the mixture as a whole.

The partial ester compositions of my invention are especially suitable for use in water dispersions in which form they are toxic to many common insect pests. The compositions are readily dispersible in water by emulsifying agents, such as soaps, or by mechanical dispersion. Many of them are self-dispersible.

It will be understood by those skilled in the insecticidal art that the effectiveness and optimum effective dilution varies from one insect to another and from one compound to another. It may be stated, however, that these parasiticidal compositions are valuable in the control of many insects, and particularly soft-bodied insects such as aphids and the like.

By adding other toxic agents to my compositions, or to dispersions thereof, the specific effectiveness of both may be greatly increased. This permits of using greater dilution—with consequent lessening of any possible injury to foliage—and extends the range to more resistant varieties of parasites. Many toxic materials can be thus combined, such as pyrethrin concentrates, nicotine and its salts, arsenates, sulfur, various copper-containing mixtures, and the like.

I have found however that combinations of a very high degree of effectiveness are produced when a rotenone-containing toxic agent is added to a partial ester product of the type described above. The rotenone can be in the form of an extract of a botanical source, powdered derris or cube root, or other available source. This combination exhibits the effect of mutually increased toxicity or synergism. The combination is more toxic than the partial ester alone or the rotenone-containing product used with a conventional inert spreader. The amount of rotenone or rotenone-containing toxic agent that can be used with the partial esters of the invention is subject to variation as will be understood by those skilled in this art. The amount must be sufficiently high to produce the synergistic effect with the ester. From about ½% to 3 or 4% of rotenone, based on the ester, can be used in various instances. About 1% rotenone is generally preferable.

The compositions of the invention can be made up and applied in accordance with usual commercial practice in dealing with insecticidal sprays. Combinations of the ester composition of the invention and other toxic agents such as rotenone can be prepared in advance by mixing the materials and then adding the mixture as a single ingredient when the spray is made up. This represents a highly convenient and satisfactory form of the combination of an ester according to the invention and another active ingredient.

The following examples illustrate comparative results using several compositions according to the invention. Red spider mite is generally accepted as a difficult insect to control but for this reason is a good example to bring out differences in performance that would not be apparent with less resistant insects.

Example 1

A composition was prepared by mixing mannitan monooleate, prepared by reacting mannitol and one mol of oleic acid at elevated temperature, with a derris extract in proportions to give a product containing 1% rotenone by weight.

The composition was dispersed in 400 parts water and the dispersion sprayed on bean plants infested with red spider mite (*Tetranychus telarius*). A kill of 64.7% of the mites was noted.

Example 2

A composition was prepared by reacting 2 mols sorbitol with 1 mol cottonseed oil at elevated temperature to produce about 2 mols sorbitan mono-esters (principally oleate and linoleate) and 1 mol glycerol mono-esters.

This composition was dispersed in 200 parts water and the dispersion sprayed on bean plants infested with red spider mite. A kill of 74.8% of the mites was noted.

Example 3

A composition was prepared by reacting 2 mols polyglycerol (chiefly diglycerol) and 1 mol cottonseed oil at elevated temperature to produce about 2 mols polyglycerol mono-esters (principally oleate and linoleate) and 1 mol glycerol mono-esters.

This composition was dispersed in 400 parts water and the dispersion sprayed on bean plants infested with red spider mite. A kill of 77.9% of the mites was noted.

Example 4

The composition of Example 3 was mixed with derris extract to give a concentration of 1% rotenone by weight, based on the ester composition.

One part of the combination was dispersed in 400 parts water and the dispersion sprayed on bean plants infested with red spider mite. A kill of 97.5% of the mites resulted.

Example 5

A composition was prepared by reacting cottonseed oil (1 mol) with pentaerythritol (2 mols) at elevated temperature to produce about 2 mols pentaerythritol mono-esters (principally oleates and linoleates) and 1 mol glycerol mono-esters. Derris extract was added to this composition to give a concentration of 1% rotenone by weight.

At 1:400 dilution with water 92.9% kill of red spider mite on bean plants was observed.

Example 6

The composition of Example 2 was mixed with derris extract to produce a combination containing 1% rotenone by weight.

At 1:400 dilution with water 91.2% kill of red spider mite on bean plants was observed.

Example 7

An alcoholysis product was made from 1 mol cottonseed oil and 2 mols mannitol at elevated temperature, the product containing about 2 mols mannitan mono-esters (chiefly oleate and linoleate) and 1 mol glycerol mono-ester. Derris extract was added to give a 1% by weight rotenone concentration.

At 1:400 dilution of the combination with water a red spider mite kill of 82.5% was obtained on bean plants infested with said mites.

In addition to the kill of active stages of insects, the compositions of my invention are effective against the eggs of many types of insects. For example, polyglycerol monooleate sprayed on eggs of red spider mite at 1:200 dilution in water prevented hatching of 63.2% of the eggs.

The invention is not limited to use in the control of any single type of insect. While soft-bodied varieties are more readily affected by these esters many hard bodied types can be controlled by their use especially in the form of combinations with stomach poisons.

Many variations from the specific examples can be made and the invention is to be limited only by the scope of the following claims.

I claim:

1. An active ingredient for insecticides comprising a synergistic combination of a rotenone-containing toxic agent and a partial ester of a neutral, low molecular weight polyhydroxylic organic compound with at least 4 carbon atoms and a ratio of carbon atoms to hydroxyl groups not exceeding 3, and as the only substituent a fatty acid of 18 carbon atoms selected from the group consisting of monoenoid and dienoid acids.

2. An active ingredient for insecticides as in claim 1 wherein said polyhydroxylic organic compound is selected from the group consisting of polyhydric alcohols, polyhydric inner ethers of polyhydric alcohols, and polyhydric external ethers of polyhydric alcohols.

3. An active ingredient for insecticides as in claim 1 wherein the said partial ester is an alcoholysis product of said polyhydroxylic organic compound and a semi-drying vegetable oil.

4. An active ingredient for insecticides as in claim 1 wherein the said partial ester is a monoester and is the alcoholysis product of said polyhydroxylic organic compound and a semi-drying vegetable oil.

5. An active ingredient for insecticides as in claim 1 wherein the said partial ester is a monoester, said polyhydroxylic organic compound is polyglycerol, and the said partial ester is the alcoholysis product of said polyglycerol and a semi-drying vegetable oil.

6. An active ingredient for insecticides as in claim 1 wherein the said partial ester is a monoester, the said polyhydroxylic organic compound is a hexitan, and the said partial hexitan ester is the alcoholysis product of a hexitol and a semi-drying vegetable oil.

7. An active ingredient for insecticides as in claim 1 wherein said partial ester is a monoester, the said polyhydroxylic organic compound is pentaerythritol, and the said partial ester is the alcoholysis product of said pentaerythritol and a semi-drying vegetable oil.

8. The process of controlling insect infestations on plants which comprises applying to the infested plants an aqueous spray containing as a toxic ingredient a partial ester of a neutral, low molecular weight polyhydroxylic organic compound with at least 4 carbon atoms, and wherein the ratio of carbon atoms to hydroxyl groups does not exceed 3, and as the only substituent a fatty acid of 18 carbon atoms selected from the group consisting of monoenoid and dienoid acids.

9. The process of controlling insect infestations which comprises applying to the insects an aqueous spray containing as a toxic ingredient a partial ester of a neutral low molecular weight polyhydroxylic organic compound with at least 4 carbon atoms and with a ratio of carbon atoms to hydroxyl groups not exceedng 3, said polyhydroxylic compound being selected from the group consisting of polyhydric alcohols, polyhydric inner ethers of polyhydric alcohols and polyhydric external ethers of polyhydric alcohols, and as the only substituent a fatty acid of 18 carbon atoms selected from the group consisting of monoenoid and dienoid acids.

10. A process as in claim 8 wherein the said partial ester is an alcoholysis product of said polyhydroxylic organic compound and a semi-drying vegetable oil.

11. A process as in claim 8 wherein the said partial ester is a monoester and is the alcoholysis product of said polyhydroxylic organic compound and a semi-drying vegetable oil.

12. A process as in claim 8 wherein the said partial ester is a monoester and is the alcoholysis product of polyglycerol and a semi-drying vegetable oil.

13. A process as in claim 8 wherein the said partial ester is the alcoholysis product of a hexitol and a semi-drying vegetable oil, said alcoholysis product comprising a hexitan monoester of the fatty acid of said vegetable oil.

14. A process as in claim 8 wherein the said partial ester is the alcoholysis product of pentaerythritol and a semi-drying vegetable oil, said alcoholysis product comprising a monoester of pentaerythritol and the fatty acid of said vegetable oil.

15. The process of controlling insect infestation which comprises applying to the insects an aqueous spray containing as a toxic ingredient a synergistic combination of a rotenone-containing toxic agent and a partial ester of a neutral, low molecular weight polyhydroxylic organic compound with at least 4 carbon atoms and a ratio of carbon atoms to hydroxyl groups not exceeding 3, and as the only substituent a fatty acid of 18 carbon atoms selected from the group consisting of monoenoid and dienoid acids.

KENNETH R. BROWN.